US012577344B2

(12) United States Patent
Chen

(10) Patent No.: US 12,577,344 B2
(45) Date of Patent: Mar. 17, 2026

(54) ONE COMPONENT (1K) COMPOSITION BASED ON EPOXY RESIN

(71) Applicant: Henkel AG & Co. KGaA, Duesseldorf (DE)

(72) Inventor: Chunfu Chen, Kanagawa (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 806 days.

(21) Appl. No.: 17/833,148

(22) Filed: Jun. 6, 2022

(65) Prior Publication Data

US 2022/0298283 A1 Sep. 22, 2022

Related U.S. Application Data

(63) Continuation of application No. PCT/EP2020/084035, filed on Dec. 1, 2020.

(30) Foreign Application Priority Data

Dec. 4, 2019 (EP) .................................... 19213406

(51) Int. Cl.
*C08F 283/10* (2006.01)
*C09D 151/08* (2006.01)
*C09J 151/08* (2006.01)

(52) U.S. Cl.
CPC .......... *C08F 283/10* (2013.01); *C09D 151/08* (2013.01); *C09J 151/08* (2013.01)

(58) Field of Classification Search
CPC ..... C08F 283/10; C09D 151/08; C09J 151/08
See application file for complete search history.

(56) References Cited

U.S. PATENT DOCUMENTS 3,859,379 A 1/1975 Kitamura et al.
3,909,480 A 9/1975 Ogata et al.
5,188,767 A 2/1993 Yamazaki et al.

FOREIGN PATENT DOCUMENTS

EP 0197524 10/1986
JP H04218524 A 8/1992
JP H06184278 A 7/1994
JP H093157 A 1/1997

OTHER PUBLICATIONS

Machine Translation of Kurosaki (JPS62246925) (Year: 1987).*
PCT International Search Report for International Application No. PCT/EP2020/084035—Mailing date: Feb. 16, 2021.

* cited by examiner

*Primary Examiner* — John M Cooney
*Assistant Examiner* — Adam J Berro
(74) *Attorney, Agent, or Firm* — Steven C. Bauman

(57) ABSTRACT

The present invention is directed to an one-component (1K) composition comprising, based on the weight of the composition:

from 40 to 98 wt. % of a) at least one epoxy resin;
from 0.5 to 30 wt. % of b) at least one organoboron compound selected from tetrasubstituted borate salts of monovalent cations of tertiary amines; and,
from 0.5 to 30 wt. % of c) at least one (meth)acrylamide monomer of Formula (VII):

(VII)

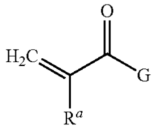

wherein: $R^a$ is H or Me;
G is selected from —$NH_2$, —$NHR^b$ and —$N(R^b)(R^c)$;
$R^b$ and $R^c$ are independently selected from $C_1$-$C_{18}$ alkyl, $C_1$-$C_{18}$ hydroxyalkyl, $C_1$-$C_{18}$ alkalkoxy, $C_6$-$C_{18}$ aryl and —$(CH_2)_n$—$N(R^d)(R^e)$;
n is an integer of from 1 to 4; and,
$R^d$ and $R^e$ are independently selected from H and $C_1$-$C_6$ alkyl.

7 Claims, No Drawings

ONE COMPONENT (1K) COMPOSITION BASED ON EPOXY RESIN

FIELD OF THE INVENTION

The present invention is directed to one component (1K) compositions based on epoxy resins. More particularly, the present invention is directed to one component compositions comprising an epoxy resin, an organic borate compound and an acrylamide monomer.

BACKGROUND OF THE INVENTION

Epoxy resins have found a broad range of application, predominantly on the basis that a particular selection of resin, modifier and cross-linking agent (or curative) can allow the properties of the cured epoxy resin to be tailored to achieve specific performance characteristics.

That versatility being acknowledged, properly cured epoxy resins also possess a plurality of other attributes including inter alia: excellent chemical resistance, particularly to alkaline environments; high tensile and compressive strengths; high fatigue strength; low shrinkage upon cure; and, electrical insulation properties and retention thereof upon aging or environmental exposure.

The present state-of-the-art for fast-curing epoxy formulations includes epoxy resin and curatives which are generally presented as two-component (2K) compositions on account of the extremely limited shelf life of the compositions after being mixed and prior to use. However, it is recognized that the development of one component epoxy resin compositions would remove the inconvenience of in situ metering, blending and de-gassing associated with the use of two-component (2K) compositions.

On account of the fact the epoxy resin and hardener or curative are packaged together, a one-component (1K) composition must exhibit a latent cure: curing cannot commence under ordinary conditions of storage and transportation but instead must be delayed until the composition is exposed to specific curing conditions, such as an elevated temperature.

According to one conventional approach, one component (1K) epoxy compositions may comprise suspensions of solid curative(s) in the epoxy resin, which curatives are latent by virtue of their low solubility in the epoxy matrix. Examples of such an approach are documented in inter alia: U.S. Pat. Nos. 3,519,576; 3,520,905; and, U.S. Pat. No. 4,866,133. A plurality of one-component compositions based on epoxy-dicyandiamide have been commercialized: for example, WO2014/165423 (Air Products and Chemicals Inc.) describes a one-component composition comprising: at least one tertiary amine salt, said salt being the product of at least one carboxylic acid and at least one tertiary amine selected from the group consisting of N-hydroxyethylpiperidine, N-hydroxyethylmorpholine, 1,4-bis(2-hydroxyethyl)piperazine, 1-ethylpiperidine, N,N-dimethylcyclophexane and dimethylethanolamine; at least one epoxy resin; and, at least one dicyandiamide.

Problematically, systems based on the use of such solid, particulate hardeners tend to have limitations of high viscosity and relatively long curing times. Moreover, any heterogeneous distribution of the particulate hardeners within the compositions can lead to uncured regions in the formed products. And these identified problems have led to a number of authors seeking to homogenize the distribution of the curatives in one component compositions. For instance, Japanese Patent Laid-Open Publication No. 2004-27159 describes a one component epoxy resin composition in which a liquid phenol resin is predominantly used as a curing agent in combination with a solid latent curing agent: whilst this composition is purported to provide excellent storage stability, using a liquid phenol resin as the majority curing agent diminishes the physical strength of the cured resin.

Further authors have sought to solubilize dicyandiamide in which regard may be noted: U.S. Pat. Nos. 4,859,761; 4,621,128; 3,420,794; and EP2180012A1.

In lieu of employing particulate curatives, chemical blocking has been considered as an alternative approach to moderating the latency of hardeners. An example thereof may be found in US2007149727 (Okuhira et al.) wherein modified amines show low curing efficiency because the cross-linking depends on the hydrolysis of imine groups to generate amines. Further, EP 2999730 A (Inst. Mr Textil and Faserforschung Dekendorf Deustche) describes protected N-heterocyclic carbenes which are stable at room temperature for the order of days when stored under inert conditions. The development of protected functionalities such as those exemplified can however be complicated and uneconomical.

As such, there is considered to remain a need in the art to develop stable one-component, liquid epoxy systems which provide the combination of fast cure, good processability and economic fabrication.

STATEMENT OF THE INVENTION

In accordance with a first aspect of the present invention there is provided an one component (1K) composition comprising, based on the weight of the composition:

from 40 to 98 wt. %, preferably from 50 to 98 wt. % of a) at least one epoxy resin;

from 0.5 to 30 wt. %, preferably from 1 to 25 wt. % of b) at least one organoboron compound selected from tetrasubstituted borate salts of monovalent cations of tertiary amines; and, from 0.5 to 30 wt. %, preferably from 1 to 25 wt. %, of c) at least one (meth)acrylamide monomer of Formula (VII):

(VII)

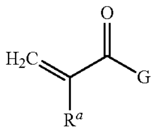

wherein: $R^a$ is H or Me;

G is selected from $—NH_2$, $—NHR^b$ and $—N(R^b)(R^c)$;

$R^b$ and $R^c$ are independently selected from $C_1$-$C_{18}$ alkyl, $C_1$-$C_{18}$ hydroxyalkyl, $C_1$-$C_{18}$ alkalkoxy, $C_6$-$C_{18}$ aryl and $—(CH_2)_n—N(R^d)(R^e)$;

n is an integer of from 1 to 4; and, $R^d$ and $R^e$ are independently selected from H and $C_1$-$C_6$ alkyl.

The liquid composition as defined above exhibits propitious storage stability at room temperature. Moreover, the liquid composition as defined above can advantageously possess a low viscosity at room temperature but be cured at an elevated temperature within a practicable duration.

The anion of the salt b) is desirably a tetra($C_1$-$C_6$ alkyl) borate, tetraphenyl borate or substituted tetraphenylborate anion: a preference for tetraphenylborate may be mentioned. Whilst the monovalent cation of the salt b) may be a tetraalkylammonium ion, it is preferred that the cation is a heterocyclic moiety—which may be monocyclic, bicyclic or polycyclic—in which the charged nitrogen atom is part of the heteroaliphatic or heteroaromatic ring system. Thus, in a particular embodiment, part b) of the composition comprises a cycloamidinium tetrasubstituted borate salt and/or an imidazolium tetrasubstituted borate salt. For example, good results have been obtained where part c) comprises at least one salt selected from the group consisting of: imidazolium tetraphenylborate, methylimidazolium tetraphenylborate, 2-ethyl-4-methylimidazolium tetraphenylborate, 2-ethyl-1,4-dimethylimidazolium tetraphenylborate, 8-benzyl-1,8-diazabicyclo[5.4.0]undec-7-enium tetraphenylborate; 1,8-diazabicyclo[5.4.0]undec-7-ene tetraphenylborate; and, 1,5-diazabicyclo[4.3.0]-non-5-ene tetraphenylborate.

In accordance with a second aspect of the invention there is provided a cured product obtained from the one component (1K) composition as defined herein above and in the appended claims.

A further aspect of the present invention provides for the use of the cured reaction product as defined herein above and in the appended claims as a coating, sealant or adhesive.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

As used herein, the term "consisting of" excludes any element, ingredient, member or method step not specified.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Further, in accordance with standard understanding, a weight range represented as being "from 0" specifically includes 0 wt. %: the ingredient defined by said range may or may not be present in the composition.

The words "preferred", "preferably", "desirably" and "particularly" are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein, room temperature is 23° C. plus or minus 2° C. As used herein, "ambient conditions" means the temperature and pressure of the surroundings in which the composition is located or in which a coating layer or the substrate of said coating layer is located.

The term "monofunctional", as used herein, refers to having one polymerizable moiety. The term "polyfunctional", as used herein, refers to having more than one polymerizable moiety.

As used herein, the term "equivalent (eq.")" relates, as is usual in chemical notation, to the relative number of reactive groups present in the reaction.

The term "equivalent weight" as used herein refers to the molecular weight divided by the number of a function concerned. As such, "epoxy equivalent weight" (EEW) means the weight of resin, in grams, that contains one equivalent of epoxy.

As used herein, the term "epoxide" denotes a compound characterized by the presence of at least one cyclic ether group, namely one wherein an ether oxygen atom is attached to two adjacent carbon atoms thereby forming a cyclic structure. The term is intended to encompass monoepoxide compounds, polyepoxide compounds (having two or more epoxide groups) and epoxide terminated prepolymers. The term "monoepoxide compound" is meant to denote epoxide compounds having one epoxy group. The term "polyepoxide compound" is meant to denote epoxide compounds having at least two epoxy groups. The term "diepoxide compound" is meant to denote epoxide compounds having two epoxy groups.

The epoxide may be unsubstituted but may also be inertly substituted. Exemplary inert substituents include chlorine, bromine, fluorine and phenyl.

As used herein, "(meth)acryl" is a shorthand term referring to "acryl" and/or "methacryl". Thus, the term "(meth) acrylamide" refers collectively to acrylamide and methacrylamide.

As used herein, "$C_1$-$C_n$ alkyl" group refers to a monovalent group that contains 1 to n carbons atoms, that is a radical of an alkane and includes straight-chain and branched organic groups. As such, a "$C_1$-$C_{30}$ alkyl" group refers to a monovalent group that contains from 1 to 30 carbons atoms, that is a radical of an alkane and includes straight-chain and branched organic groups. Examples of alkyl groups include but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. Where applicable, a preference for a given substituent will be noted in the specification. In general, however, a preference for unsubstituted alkyl groups containing from 1-18 carbon atoms ($C_1$-$C_{18}$ alkyl)—for example unsubstituted alkyl groups containing from 1 to 12 carbon atoms ($C_1$-$C_{12}$ alkyl) or from 1 to 6 carbon atoms ($C_1$-$C_6$ alkyl)—should be noted.

The term "$C_1$-$C_{18}$ hydroxyalkyl" as used herein refers to a HO-(alkyl) group having from 1 to 18 carbon atoms, where the point of attachment of the substituent is through the oxygen-atom and the alkyl group is as defined above.

An "alkoxy group" refers to a monovalent group represented by —OA where A is an alkyl group: non-limiting examples thereof are a methoxy group, an ethoxy group and an iso-propyloxy group. The term "$C_1$-$C_{18}$ alkalkoxy" as used herein refers to an alkyl group having an alkoxy substituent as defined above and wherein the moiety (alkyl-O-alkyl) comprises in total from 1 to 18 carbon atoms: such groups include methoxymethyl ($-CH_2OCH_3$), 2-methoxyethyl ($-CH_2CH_2OCH_3$) and 2-ethoxyethyl.

The term "$C_2$-$C_4$ alkylene" as used herein, is defined as saturated, divalent hydrocarbon radical having from 2 to 4 carbon atoms.

The term "$C_3$-$C_{30}$ cycloalkyl" is understood to mean an optionally substituted, saturated, mono-, bi- or tricyclic hydrocarbon group having from 3 to 30 carbon atoms. In general, a preference for cycloalkyl groups containing from 3-18 carbon atoms ($C_3$-$C_{18}$ cycloalkyl groups) should be noted. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; ($C_1$-$C_4$)alkylphenyl, such as tolyl and ethylphenyl; indenyl; naphthalenyl, tetrahydronaphthyl, tetrahydroindenyl; tetrahydroanthracenyl; and, anthracenyl. And a preference for phenyl groups may be noted.

As used herein, "$C_2$-$C_{20}$ alkenyl" refers to hydrocarbyl groups having from 2 to 20 carbon atoms and at least one unit of ethylenic unsaturation. The alkenyl group can be straight chained, branched or cyclic and may optionally be substituted. The term "alkenyl" also encompasses radicals having "cis" and "trans" configurations, or alternatively, "E" and "Z" configurations, as appreciated by those of ordinary skill in the art. In general, however, a preference for unsubstituted alkenyl groups containing from 2 to 10 ($C_{2-10}$) or 2 to 8 ($C_{2-8}$) carbon atoms should be noted. Examples of said $C_2$-$C_{12}$ alkenyl groups include, but are not limited to: $—CH{=}CH_2$; $—CH{=}CHCH_3$; $—CH_2CH{=}CH_2$; $—C({=}CH_2)(CH_3)$; $—CH{=}CHCH_2CH_3$; $—CH_2CH{=}CHCH_3$; $—CH_2CH_2CH{=}CH_2$; $—CH{=}C(CH_3)_2$; $—CH_2C({=}CH_2)(CH_3)$; $—C({=}CH_2)CH_2CH_3$; $—C(CH_3){=}CHCH_3$; $—C(CH_3)CH{=}CH_2$; $—CH{=}CHCH_2CH_2CH_3$; $—CH_2CH{=}CHCH_2CH_3$; $—CH_2CH_2CH{=}CHCH_3$; $—CH_2CH_2CH_2CH{=}CH_2$; $—C({=}CH_2)CH_2CH_2CH_3$; $—C(CH_3){=}CHCH_2CH_3$; $—CH(CH_3)CH{=}CHCH$; $—CH(CH_3)CH_2CH{=}CH_2$; $—CH_2CH{=}C(CH_3)_2$; 1-cyclopent-1-enyl; 1-cyclopent-2-enyl; 1-cyclopent-3-enyl; 1-cyclohex-1-enyl; 1-cyclohex-2-enyl; and, 1-cyclohexyl-3-enyl.

As used herein, "alkylaryl" refers to alkyl-substituted aryl groups and "substituted alkylaryl" refers to alkylaryl groups further bearing one or more substituents as set forth above. Further, as used herein "aralkyl" means an alkyl group substituted with an aryl radical as defined above.

The term "hetero" as used herein refers to groups or moieties containing one or more heteroatoms, such as N, O, Si and S. Thus, for example "heterocyclic" refers to cyclic groups having, for example, N, O, Si or S as part of the ring structure. "Heteroalkyl" and "heterocycloalkyl" moieties are alkyl and cycloalkyl groups as defined hereinabove, respectively, containing N, O, Si or S as part of their structure.

As used herein, the term "catalytic amount" means a sub-stoichiometric amount of catalyst relative to a reactant, except where expressly stated otherwise.

As employed herein a "primary amino group" refers to an $NH_2$ group that is attached to an organic radical, and a "secondary amino group" refers to an NH group that is attached to two organic radicals, which may also together be part of a ring. The term "tertiary amine" thus references a nitrogen bearing moiety of which a nitrogen atom is not bound to a hydrogen atom. Where used, the term "amine hydrogen" refers to the hydrogen atoms of primary and secondary amino groups.

The term "photoinitiator" as used herein denotes a compound which can be activated by an energy-carrying activation beam—such as electromagnetic radiation—for instance upon irradiation therewith. The term is intended to encompass both photoacid generators and photobase generators. Specifically, the term "photoacid generator" refers to a compound or polymer which generates an acid for the catalysis of the acid hardening resin system upon exposure to actinic radiation. The term "photobase generator" means any material which when exposed to suitable radiation generates one or more bases.

The term "Lewis acid" used herein denotes any molecule or ion—often referred to as an electrophile—capable of combining with another molecule or ion by forming a covalent bond with two electrons from the second molecule or ion: a Lewis acid is thus an electron acceptor.

The molecular weights referred to in this specification can be measured with gel permeation chromatography (GPC) using polystyrene calibration standards, such as is done according to ASTM 3536.

As used herein, "anhydrous" means the relevant composition includes less than 0.25% by weight of water. For example, the composition may contain less than 0.1% by weight of water or be completely free of water. The term "essentially free of solvent" should be interpreted analogously as meaning the relevant composition comprises less than 0.25% by weight of solvent.

Viscosities of the coating compositions described herein are, unless otherwise stipulated, measured using the Brookfield Viscometer, Model RVT at standard conditions of 20° C. and 50% Relative Humidity (RH). The viscometer is calibrated using silicone oils of known viscosities, which vary from 5,000 cps to 50,000 cps. A set of RV spindles that attach to the viscometer are used for the calibration. Measurements of the coating compositions are done using the No. 6 spindle at a speed of 20 revolutions per minute for 1 minute until the viscometer equilibrates. The viscosity corresponding to the equilibrium reading is then calculated using the calibration.

DETAILED DESCRIPTION OF THE INVENTION a) Epoxide Compounds

The composition of the present invention should typically comprise epoxy resins a) in an amount of from 40 to 98 wt. %, preferably from 50 to 98 wt. % based on the weight of the composition. For example, the composition of the present invention may contain from 60 to 90 wt. % of said epoxy resin(s) a), based on the weight of the composition.

Epoxy resins as used herein may include mono-functional epoxy resins, multi- or poly-functional epoxy resins, and combinations thereof. The epoxy resins may be pure compounds but equally may be mixtures epoxy functional compounds, including mixtures of compounds having different numbers of epoxy groups per molecule. An epoxy resin may be saturated or unsaturated, aliphatic, cycloaliphatic, aromatic or heterocyclic and may be substituted. Further, the epoxy resin may also be monomeric or polymeric.

Without intention to limit the present invention, illustrative monoepoxide compounds include: alkylene oxides; epoxy-substituted cycloaliphatic hydrocarbons, such as cyclohexene oxide, vinylcyclohexene monoxide, (+)-cis-limonene oxide, (+)-cis,trans-limonene oxide, (−)-cis,trans-limonene oxide, cyclooctene oxide, cyclododecene oxide and α-pinene oxide; epoxy-substituted aromatic hydrocarbons; monoepoxy substituted alkyl ethers of monohydric alcohols or phenols, such as the glycidyl ethers of aliphatic, cycloaliphatic and aromatic alcohols; monoepoxy-substituted alkyl esters of monocarboxylic acids, such as glycidyl esters of aliphatic, cycloaliphatic and aromatic monocarboxylic acids; monoepoxy-substituted alkyl esters of polycarboxylic acids wherein the other carboxy group(s) are esterified with alkanols; alkyl and alkenyl esters of epoxy-substituted monocarboxylic acids; epoxyalkyl ethers of polyhydric alcohols wherein the other OH group(s) are esterified or etherified with carboxylic acids or alcohols; and, monoesters of polyhydric alcohols and epoxy monocarboxylic acids, wherein the other OH group(s) are esterified or etherified with carboxylic acids or alcohols.

By way of example, the following glycidyl ethers might be mentioned as being particularly suitable monoepoxide compounds for use herein: methyl glycidyl ether; ethyl glycidyl ether; propyl glycidyl ether; butyl glycidyl ether; pentyl glycidyl ether; hexyl glycidyl ether; cyclohexyl glycidyl ether; octyl glycidyl ether; 2-ethylhexyl glycidyl ether; allyl glycidyl ether; benzyl glycidyl ether; phenyl glycidyl ether; 4-tert-butylphenyl glycidyl ether; 1-naphthyl glycidyl ether; 2-naphthyl glycidyl ether; 2-chlorophenyl glycidyl ether; 4-chlorophenyl glycidyl ether; 4-bromophenyl glycidyl ether; 2,4,6-trichlorophenyl glycidyl ether; 2,4,6-tribromophenyl glycidyl ether; pentafluorophenyl glycidyl ether; o-cresyl glycidyl ether; m-cresyl glycidyl ether; and, p-cresyl glycidyl ether.

In an important embodiment, the monoepoxide compound conforms to Formula (I) herein below:

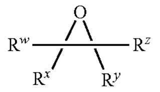

(I)

wherein: $R^w$, $R^x$, $R^y$ and $R^z$ may be the same or different and are independently selected from hydrogen, a halogen atom, a $C_1$-$C_8$ alkyl group, a $C_3$ to $C_{10}$ cycloalkyl group, a $C_2$-$C_{12}$ alkenyl, a $C_6$-$C_{18}$ aryl group or a $C_7$-$C_{18}$ aralkyl group, with the proviso that at least one of $R^y$ and $R^z$ is not hydrogen.

It is preferred that $R^w$, $R^x$ and $R^y$ are hydrogen and $R^z$ is either a phenyl group or a $C_1$-$C_8$ alkyl group and, more preferably, a $C_1$-$C_4$ alkyl group.

Having regard to this embodiment, exemplary monoepoxides include: ethylene oxide; 1,2-propylene oxide (propylene oxide); 1,2-butylene oxide; cis-2,3-epoxybutane; trans-2,3-epoxybutane; 1,2-epoxypentane; 1,2-epoxyhexane; 1,2-heptylene oxide; decene oxide; butadiene oxide; isoprene oxide; and, styrene oxide.

In the present invention, reference is made to using at least one monoepoxide compound selected from the group consisting of: ethylene oxide; propylene oxide; cyclohexene oxide; (+)-cis-limonene oxide; (+)-cis,trans-limonene oxide; (−)-cis,trans-limonene oxide; cyclooctene oxide; and, cyclododecene oxide.

Again, without intention to limit the present invention, suitable polyepoxide compounds may be liquid, solid or in solution in solvent. Further, such polyepoxide compounds should have an epoxide equivalent weight of from 100 to 700 g/eq, for example from 120 to 320 g/eq. And generally, diepoxide compounds having epoxide equivalent weights of less than 500 g/eq. or even less than 400 g/eq. are preferred: this is predominantly from a costs standpoint, as in their production, lower molecular weight epoxy resins require more limited processing in purification.

As examples of types or groups of polyepoxide compounds which may be polymerized in present invention, mention may be made of: glycidyl ethers of polyhydric alcohols and polyhydric phenols; glycidyl esters of polycarboxylic acids; and, epoxidized polyethylenically unsaturated hydrocarbons, esters, ethers and amides.

Suitable diglycidyl ether compounds may be aromatic, aliphatic or cycloaliphatic in nature and, as such, can be derivable from dihydric phenols and dihydric alcohols. And useful classes of such diglycidyl ethers are: diglycidyl ethers of aliphatic and cycloaliphatic diols, such as 1,2-ethanediol, 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; polyalkyleneglycol based diglycidyl ethers, in particular polypropyleneglycol diglycidyl ethers; and, polycarbonatediol based glycidyl ethers.

Further illustrative polyepoxide compounds include but are not limited to: glycerol polyglycidyl ether; trimethylolpropane polyglycidyl ether; pentaerythritol polyglycidyl ether; diglycerol polyglycidyl ether; polyglycerol polyglycidyl ether; and, sorbitol polyglycidyl ether.

Glycidyl esters of polycarboxylic acids having utility in the present invention are derived from polycarboxylic acids which contain at least two carboxylic acid groups and no other groups reactive with epoxide groups. The polycarboxylic acids can be aliphatic, cycloaliphatic, aromatic and heterocyclic. The preferred polycarboxylic acids are those which contain not more than 18 carbon atoms per carboxylic acid group of which suitable examples include but are not limited to: oxalic acid; sebacic acid; adipic acid; succinic acid; pimelic acid; suberic acid; glutaric acid; dimer and trimer acids of unsaturated fatty acids, such as dimer and trimer acids of linseed fatty acids; phthalic acid; isophthalic acid; terephthalic acid; trimellitic acid; trimesic acid; phenylene-diacetic acid; chlorendic acid; hexahydrophthalic acid, in particular hexahydroorthophthalic acid (1,2-cyclohexanedicarboxylic acid); diphenic acid; naphthalic acid; polyacid terminated esters of di-basic acids and aliphatic polyols; polymers and co-polymers of (meth)acrylic acid; and, crotonic acid.

Other suitable diepoxides which might also be mentioned include: diepoxides of double unsaturated fatty acid $C_1$-$C_{18}$ alkyl esters; butadiene diepoxide; polybutadiene diglycidyl ether; vinylcyclohexene diepoxide; and, limonene diepoxide.

And examples of highly preferred polyepoxide compounds include: bisphenol-A epoxy resins, such as DER™ 331, DER™ 332, DER™ 383, JER™ 828 and Epotec YD 128; bisphenol-F epoxy resins, such as DER™ 354; bisphenol-NF epoxy resin blends, such as DER™ 353; aliphatic glycidyl ethers, such as DER™ 736; polypropylene glycol diglycidyl ethers, such as DER™ 732; solid bisphenol-A epoxy resins, such as DER™ 661 and DER™ 664 UE; solutions of bisphenol-A solid epoxy resins, such as DER™ 671-X75; epoxy novolac resins, such as DEN™ 438; brominated epoxy resins such as DER™ 542; castor oil triglycidyl ether, such as ERISYS™ GE-35H; polyglycerol-3-polyglycidyl ether, such as ERISYS™ GE-38; sorbitol glycidyl ether, such as ERISYS™ GE-60; and, bis(2,3-epoxypropyl)cyclohexane-1,2-dicarboxylate, available as Lapox Arch-11.

Whilst it does not represent a preferred embodiment, the present invention does not preclude the curable compositions further comprising one or more cyclic monomers selected from the group consisting of: oxetanes; cyclic carbonates; cyclic anhydrides; and, lactones. The disclosures of the following citations may be instructive in disclosing suitable cyclic carbonate functional compounds: U.S. Pat.

Nos. 3,535,342; 4,835,289; 4,892,954; UK Patent No. GB-A-1,485,925; and, EP-A-0 119 840. However, such cyclic co-monomers should constitute less than 20 wt. %, preferably less than 10 wt. % or less than 5 wt. %, based on the total weight of the epoxide compounds.

b) Organoboron Compound

The composition of the present comprises, based on the weight of the composition, from 0.5 to 30 wt. %, preferably from 1 to 25 wt. %, of b) at least one organoboron compound as defined herein below. For example, the composition of the present invention may contain from 5 to 25 wt. % or from 5 to 20 wt. % of b) said at least one organoboron compound, based on the weight of the composition.

The at least one organoboron compound is selected from tetrasubstituted borate salts of monovalent cations of tertiary amines. The tetrasubstituted borate anion thereof may be represented by the general Formula (II):

(II)

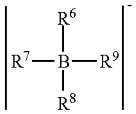

$R^6$, $R^7$, $R^8$ and $R^9$ are independently selected from $C_1$-$C_6$ alkyl, $C_6$-$C_{18}$ aryl and $C_7$-$C_{24}$ alkylaryl. Whilst the monovalent cation may be a tetraalkylammonium ion, it is preferred that the cation is a heterocyclic moiety—which may be monocyclic, bicyclic or polycyclic—in which the charged nitrogen atom is part of the heteroaliphatic or heteroaromatic ring system.

Examples of the heterocyclic tertiary amines from which the monovalent cations may be derived include: pyridines, such as picoline (methylpyridine), isoquinoline, quinoline (1-benzopyridine), N,N-dimethyl-4-aminopyridine, bipyridine and 2,6-lutidine; imidazoles; pyrazoles, such as pyrazole and 1,4-dimethylpyrazole; morpholines, such as 4-(2-hydroxyethyl)morpholine, N-ethylmorpholine, N-methylmorpholine and 2,2'-dimorpholinediethyl ether; piperazines, such as 1-(2-hydroxyethyl)piperazine and N,N-dimethylpiperazine; piperidines, such as N-(2-hydroxyethyl)piperidine, N-ethylpiperidine, N-propylpiperidine, N-butylpiperidine N-hexylpiperidine, N-cyclohexylpiperidine and N-octylpiperidine; pyrrolidines such as N-butylpyrrolidine and N-octylpyrrolidine; and, cycloamidines. Further exemplary heterocyclic amines include hexamethylenetetramine, hexaethylenetetramine and hexapropyltetramine. However, a preference for cycloamidinium and imidazolium cations may be mentioned.

In a first embodiment, the organoboron compounds of this part of the composition are represented by general Formula (III) below:

Formula (III)

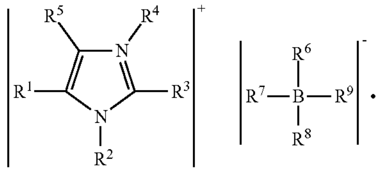

wherein: $R^1$, $R^2$, $R^3$, $R^4$ and $R^5$ are independently selected from hydrogen, $C_1$-$C_{18}$ alkyl, $C_6$-$C_{18}$ aryl, $C_3$-$C_{18}$ cycloalkyl, $C_2$-$C_{20}$ alkenyl, —C(O)$R^q$, —C(O)OH, —CN and —$NO_2$;

$R^q$ is $C_1$-$C_6$ alkyl; and, $R^6$, $R^7$, $R^8$ and $R^9$ are independently selected from $C_1$-$C_6$ alkyl, $C_6$-$C_{18}$ aryl and $C_7$-$C_{24}$ alkylaryl.

Preferably $R^1$, $R^2$, $R^3$, $R^4$ and $R^5$ are independently selected from hydrogen, $C_1$-$C_{12}$ alkyl, $C_6$-$C_{18}$ aryl, $C_3$-$C_{12}$ cycloalkyl, $C_2$-$C_6$ alkenyl, —$CO_2H$, —CN and —$NO_2$. Alternatively, or additionally to that statement of preference for the imidazole moiety, at least three of $R^6$, $R^7$, $R^8$ and $R^9$ in the borate moiety are the same. More preferably $R^6$, $R^7$, $R^8$ and $R^9$ are all the same and are selected from $C_1$-$C_6$ alkyl and phenyl. A particular preference is noted for the tetraphenylborate anion.

Exemplary compounds according to Formula (III), which may be used alone or in admixture, include but are not limited to: imidazolium tetraphenylborate; methylimidazolium tetraphenylborate; 2-ethyl-4-methylimidazolium tetraphenylborate; 2-ethyl-1,4-dimethylimidazolium tetraphenylborate; 1-cyanoethyl-2-ethyl-4-methylimidazolium tetraphenylborate; 1-cyanoethyl-2-undecylimidazolium tetraphenylborate; 1-cyanoethyl-2-phenylimidazolium tetraphenylborate; 1-vinyl-2-methylimidazolium tetraphenylborate; 1-vinyl-2,4-dimethylimidazolium tetraphenylborate; 1-β-hydroxy-ethyl-2-methyl-imidazolium tetraphenylborate; 1-allyl-2-methylimidazolium tetraphenylborate; 1-allyl-2-phenylimidazolium tetraphenylborate; and, 1-allyl-2-undecylimidazolium tetraphenylborate. A particular preference for imidazolium tetraphenylborate, methylimidazolium tetraphenylborate, 2-ethyl-4-methylimidazolium tetraphenylborate and 2-ethyl-1,4-dimethylimidazolium tetraphenylborate may be noted.

Whilst there is no intention to limit the method of synthesis of compounds of Formula (III), an illustrative preparative procedure comprises the reaction of:

I) an imidazole salt of Formula (IV)

(IV)

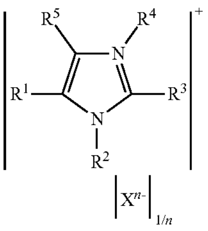

wherein $R^1$-$R^5$ are as defined hereinabove and $X^{n-}$ is a counter anion; with, ii) a tetra-substituted borate of Formula (V)

(V)

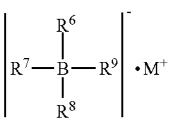

wherein $R^6$-$R^9$ are as defined hereinabove and $M^+$ is an alkali metal cation.

Preferably $X^{n-}$ is a chloride, bromide, iodide, sulfate, nitrate or acetate anion. Independently or additionally $M^+$ is preferably $Li^+$, $Na^+$ or $K^+$.

The aforementioned reaction may conventionally be performed in a polar protic solvent such as: water; acetic acid; methanol; ethanol; n-propanol); and, n-butanol. Further, the reaction temperature may conventionally be from 10° C. to 100° C., for example from 20° C. to 80° C.

For completeness, the imidazole salts of Formula (IV) may be prepared by the reaction of an imidazole as provided below

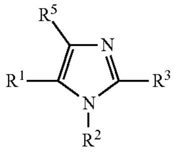

with: at least one acid selected from the group consisting of: inorganic acids, such as hydrochloric acid, sulfuric acid, and nitric acid; organic acids, such as acetic acid, oxalic acid and succinic acid; and, acidic aromatic nitro compounds, such as picric acid and picrolonic acid; and, a quaternizing agent, such as an alkylhalide, arylhalide or arylalkylhalide.

The synthesis of the imidazole salt (IV) according to this reaction may conventionally be performed in a polar protic solvent such as: water; acetic acid; methanol; ethanol; n-propanol); and, n-butanol. Further, the reaction temperature may conventionally be from 10° C. to 100° C., for example from 20° C. to 80° C.

In a second embodiment of this part of the composition, the organoboron compounds are represented by the general Formula (VI) below:

(VI)

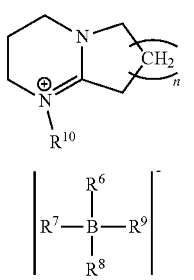

wherein: $R^{10}$ is selected from H, $C_1$-$C_6$ alkyl, $C_6$-$C_{18}$ aryl, $C_7$-$C_{24}$ aralkyl, $C_3$-$C_{18}$ cycloalkyl and $C_2$-$C_{20}$ alkenyl;

$R^6$, $R^7$, $R^8$ and $R^9$ are independently selected from $C_1$-$C_6$ alkyl, $C_6$-$C_{18}$ aryl and $C_7$-$C_{24}$ alkylaryl; and, n is an integer of from 1 to 3, for example 1 or 2.

Preferably $R^{10}$ is selected from H, $C_1$-$C_6$ alkyl, $C_3$-$C_{12}$ cycloalkyl, phenyl, naphthyl or $C_7$-$C_{12}$ aralkyl. More preferably $R^{10}$ is selected from H, $C_1$-$C_6$ alkyl, $C_3$-$C_{12}$ cycloalkyl, phenyl, naphthyl, benzyl or tolyl. Alternatively, or additionally to that statement of preference for the bicyclic moiety, at least three of $R^6$, $R^7$, $R^8$ and $R^9$ in the borate moiety are the same. More preferably $R^6$, $R^7$, $R^8$ and $R^9$ are all the same and are selected from $C_1$-$C_6$ alkyl and phenyl. A particular preference is noted for the tetraphenylborate anion.

Examples of the compounds above include: 8-benzyl-1,8-diazabicyclo[5.4.0]undec-7-enium tetraphenylborate; 1,8-diazabicyclo[5.4.0]undec-7-ene tetraphenylborate; and, 1,5-diazabicyclo[4.3.0]-non-5-ene tetraphenylborate.

c) (Meth)acrylamide Monomers

The composition of the present comprises, based on the weight of the composition, from 0.5 to 30 wt. %, preferably from 1 to 25 wt. %, of c) at least one (meth)acrylamide monomer. For example, the composition of the present invention may contain from 5 to 20 wt. % or from 5 to 15 wt. % of c) said at least one (meth)acrylamide monomer, based on the weight of the composition.

The (meth)acrylamide monomers are monofunctional and meet the following general Formula (VII):

(VII)

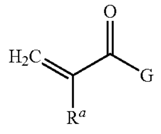

wherein: $R^e$ is H or Me;

G is selected from —$NH_2$, —$NHR^b$ and —$N(R^b)(R^c)$;

$R^b$ and $R^c$ are independently selected from $C_1$-$C_{18}$ alkyl, $C_1$-$C_{18}$ hydroxyalkyl, $C_1$-$C_{18}$ alkylalkoxy, $C_6$-$C_{18}$ aryl and —$(CH_2)_n$—$N(R^d)(R^e)$;

n is an integer of from 1 to 4; and, $R^d$ and $R^e$ are independently selected from H and $C_1$-$C_6$ alkyl.

In embodiments of the (meth)acrylamide monomers according to Formula (VII):

$R^a$ is H or Me;

G is selected from —$NH_2$, —$NHR^b$ and —$N(R^b)(R^c)$;

$R^b$ and $R^e$ are independently selected from $C_1$-$C_{12}$ alkyl, $C_1$-$C_{12}$ hydroxyalkyl, $C_1$-$C_{12}$ alkylalkoxy and —$(CH_2)_n$—$NR^d R^e$;

n is an integer of from 2 to 4; and, $R^d$ and $R^e$ are independently selected from $C_1$-$C_4$ alkyl.

Examples of suitable (meth)acrylamide monomers in accordance with Formula (VII) include but are not limited to: (meth)acrylamide; N-methyl (meth)acrylamide; N,N-dimethyl (meth)acrylamide; N-ethyl (meth)acrylamide; N,N-diethyl (meth)acrylamide; N-isopropyl (meth)acrylamide; N-n-butyl (meth)acrylamide; N-t-butyl (meth)acrylamide; N,N-di-n-butyl (meth)acrylamide; N-octyl (meth)acrylamide; N-dodecyl (meth)acrylamide; N-octadecyl (meth) acrylamide; N-phenyl (meth)acrylamide; N,N-dimethylaminoethyl (meth)acrylamide; N-(2-methoxyethyl) (meth)acrylamide; N-(2-ethoxyethyl) (meth)acrylamide N-(2-hydroxyethyl) (meth)acrylamide; and, N-(2-hydroxylpropyl) (meth)acrylamide.

Whilst it is does not represent a preferred embodiment, the present invention does not preclude the curable compositions further comprising one or more polyfunctional (meth)acrylamide compounds. However, within the curable composition, such polyfunctional (meth)acrylamide monomers should constitute less than 20 wt. %, preferably less than 10 wt. % or less than 5 wt. %, based on the total weight of c) said monofunctional (meth)acrylamide monomers.

Exemplary polyfunctional (meth)acrylamide compounds may be represented by Formula (VIII) below:

(VIII)

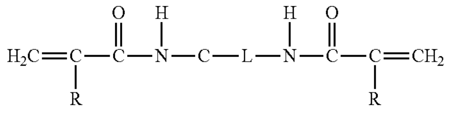

wherein: R is H or Me;

L is —O—, $C_2$-$C_4$ alkylene group or a divalent linking group formed by combining these.

Examples of the latter mentioned divalent linking group include but are not limited to: $—OCH_2CH_2—$, $—OCH_2CH_2CH_2—$, $—OCH_2CH_2CH_2CH_2—$, $—CH_2OCH_2—$, $—CH_2OCH_2CH_2—$, and $—CH_2OCH_2CH_2CH_2—$.

d) Additives and Adjunct Ingredients

Said compositions obtained in the present invention will typically further comprise adjuvants and additives that can impart improved properties to these compositions. For instance, the adjuvants and additives may impart one or more of: improved elastic properties; improved elastic recovery; longer enabled processing time; faster curing time; and, lower residual tack. Included among such adjuvants and additives are catalysts, plasticizers, coupling agents, adhesion promoters, stabilizers including UV stabilizers, antioxidants, secondary tougheners, fillers, reactive diluents, drying agents, fungicides, flame retardants, rheological adjuvants, color pigments or color pastes, and/or optionally also, to a small extent, non-reactive diluents.

Suitable catalysts are substances that promote the (homo-) polymerization of epoxide compounds. Without intention to the limit the catalysts used in the present invention, mention may be made of the following suitable catalysts: i) acids or compounds hydrolyzable to acids, in particular a) organic carboxylic acids, such as acetic acid, benzoic acid, salicylic acid, 2-nitrobenzoic acid and lactic acid; b) organic sulfonic acids, such as methanesulfonic acid, p-toluenesulfonic acid and 4-dodecylbenzenesulfonic acid; c) sulfonic acid esters; d) inorganic acids, such as phosphoric acid; e) Lewis acid compounds, such as $BF_3$ amine complexes, $SbF_6$ sulfonium compounds, bis-arene iron complexes; f) Bronsted acid compounds, such as pentafluoroantimonic acid complexes; and, e) mixtures of the aforementioned acids and acid esters; ii) phenols, in particular bisphenols; iii) phenol resins; iv) Mannich bases; and, v) phosphites, such as di- and triphenylphosphites.

In an embodiment, an amine catalyst for the curing a composition based on the epoxy resin may be photobase generator: upon exposure to UV radiation—typically in the wavelength from 320 to 420 nm—said photobase generator releases an amine. The photobase generator is not specifically limited so long as it generates an amine directly or indirectly with light irradiation. However, suitable photobase generators which may be mentioned include: benzyl carbamates; benzoin carbamates; o-carbamoylhydroxyamines; O-carbamoyloximes; aromatic sulfonamides; alpha-lactams; N-(2-allylethenyl)amides; arylazide compounds, N-arylformamides, and 4-(ortho-nitrophenyl)dihydropyridines.

For completeness, the preparation of photobase generator compounds is known in the art and an instructive reference includes U.S. Pat. No. 5,650,261 (Winkel).

In an alternative embodiment, an acid catalyst may be selected from photoacid generators (PAGs): upon irradiation with light energy, ionic photoacid generators undergo a fragmentation reaction and release one or more molecules of Lewis or Bronsted acid that catalyze the ring opening and addition of the pendent epoxide groups to form a crosslink. Useful photoacid generators are thermally stable, do not undergo thermally induced reactions with the forming copolymer and are readily dissolved or dispersed in the curable compositions.

Exemplary cations which may be used as the cationic portion of the ionic PAG of the invention include organic onium cations such as those described in U.S. Pat. Nos. 4,250,311, 3,113,708, 4,069,055, 4,216,288, 5,084,586, 5,124,417, and, 5,554,664. The references specifically encompass aliphatic or aromatic Group IVA and VIIA (CAS version) centered onium salts, with a preference being noted for I-, S-, P-, Se- N- and C-centered onium salts, such as those selected from sulfoxonium, iodonium, sulfonium, selenonium, pyridinium, carbonium and phosphonium.

As is known in the art, the nature of the counter-anion in the ionic photoacid generator (PAG) can influence the rate and extent of cationic addition polymerization of the epoxide groups with, for illustration, the order of reactivity among commonly used nucleophilic anions being $SbF_6>AsF_6>PF_6>BF_4$. The influence of the anion on reactivity has been ascribed to three principle factors which the skilled artisan should compensate for in the present invention: (1) the acidity of the protonic or Lewis acid generated; (2) the degree of ion-pair separation in the propagating cationic chain; and, (3) the susceptibility of the anions to fluoride abstraction and consequent chain termination.

It is not precluded that the compositions of the present invention include alternative photoinitiator compounds to the photobase generator and photoacid generator compounds mentioned herein above, which photoinitiator compound(s) would initiate the polymerization or hardening of the compositions upon irradiation with actinic radiation. It is noted that photo-polymerizable compositions of the present invention can be cationically polymerizable or free-radically polymerizable: whilst epoxy groups are cationically active, the composition contains a compound possessing a free-radically active, unsaturated group. Given this, preferred alternative photoinitiators would be photoactive compounds that undergo a Norrish I cleavage to generate free radicals that can initiate by addition to the acrylic double bonds.

In toto photoinitiators should be present in the photopolymerizable composition in amount of from 0.1 to 1.0 parts by weight based on 100 parts of the reactant compounds.

The use of a photoinitiator—and also the photobase generator and photoacid generators mentioned herein above—may produce residue compounds from the photochemical reaction. The residues may be detected by conventional analytical techniques such as: infrared, ultraviolet and NMR spectroscopy; gas or liquid chromatography; and, mass spectroscopy. Thus, the present invention may comprise cured (epoxy) matrix copolymers and detectable amounts of residues from a photobase/acid generator. Such residues are present in small amounts and do not normally interfere with the desired physiochemical properties of the product.

Without intention to limit the present invention, a mixture comprising one or more photoinitiators may be irradiated with activating radiation to polymerize the monomeric component(s). The purpose of the irradiation is to generate the active species from the photoinitiator which initiates the cure reactions. Once that species is generated, the cure chemistry is subject to the same rules of thermodynamics as any chemical reaction: the reaction rate may be accelerated by heat.

As would be recognized by the skilled artisan, photosensitizers can be incorporated into the compositions to improve the efficiency with which any photoinitiators present use the energy delivered. Photosensitizers are typically used in an amount of from 5 to 25 wt. %, based on the weight of the photoinitiator.

A "plasticizer" for the purposes of this invention is a substance that decreases the viscosity of the composition and thus facilitates its processability. Herein the plasticizer may constitute up to 10 wt. % or up to 5 wt. %, based on the total weight of the composition, and is preferably selected from the group consisting of: polydimethylsiloxanes (PDMS); diurethanes; ethers of monofunctional, linear or branched $C_4$-$C_{16}$ alcohols, such as Cetiol OE (obtainable from Cognis Deutschland GmbH, Dusseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as end-capped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential. It is preferred that the plasticizer comprises or consists of one or more polydimethylsiloxane (PDMS).

In certain embodiments, the composition includes up to 5 wt. %, based on the weight of the composition, of at least one epoxy silane coupling agent which can serve to enhance the adhesion of the curing composition to a given surface. The hydrolyzable groups of the coupling agent can react with the surface to remove unwanted hydroxyl groups; the epoxy groups thereof react with the film-forming polymer to chemically link said polymer with the surface. Preferably, the coupling agents possess from 1 to 3 hydrolyzable functional groups and at least one epoxy group.

Examples of suitable epoxy silane coupling agents include but are not limited to: glycidoxy polymethylenetrialkoxysilanes, such as 3-glycidoxy-1-propyl-trimethoxysilane; (meth)acryloxypolymethylenetrialkoysilanes, such as 3-methacrylyloxy-1-propyltrimethoxysilane; γ-methacryloxypropyltrimethoxysilane (A-174 available from GE Silicones); γ-glycidoxypropyltrimethoxysilane (A-187 available from Momentive Performance Materials, Inc.); α-glycidoxypropylmethyldiethoxysilane (A-2287 available from Momentive Performance Materials, Inc.); vinyl-tris-(2-methoxyethoxy)silane (A-172 from available Momentive Performance Materials, Inc.); and, α-chloropropyltrimethoxysilane (KBM-703 available from Shin-Etsu Chemical Co., Ltd.).

"Stabilizers" for purposes of this invention are to be understood as antioxidants, UV stabilizers or hydrolysis stabilizers. Herein stabilizers may constitute in toto up to 10 wt. % or up to 5 wt. %, based on the total weight of the composition. Standard commercial examples of stabilizers suitable for use herein include: sterically hindered phenols; thioethers; benzotriazoles; benzophenones; benzoates; cyanoacrylates; acrylates; amines of the hindered amine light stabilizer (HALS) type; phosphorus; sulfur; and, mixtures thereof.

As noted, the compositions according to the present invention can additionally contain fillers. Suitable here are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler.

The pyrogenic and/or precipitated silicic acids advantageously have a BET surface area from 10 to 90 $m^2/g$. When they are used, they do not cause any additional increase in the viscosity of the composition according to the present invention but do contribute to strengthening the cured composition.

It is likewise conceivable to use pyrogenic and/or precipitated silicic acids having a higher BET surface area, advantageously from 100 to 250 $m^2/g$, in particular from 110 to 170 $m^2/g$, as a filler: because of the greater BET surface area, the effect of strengthening the cured composition is achieved with a smaller proportion by weight of silicic acid.

Also suitable as fillers are hollow spheres having a mineral shell or a plastic shell. These can be, for example, hollow glass spheres that are obtainable commercially under the trade names Glass Bubbles®. Plastic-based hollow spheres, such as Expancel® or Dualite®, may be used and are described in EP 0 520 426 B1: they are made up of inorganic or organic substances and each have a diameter of 1 mm or less, preferably 500 μm or less.

Fillers which impart thixotropy to the composition may be preferred for many applications: such fillers are also described as rheological adjuvants, e.g. hydrogenated castor oil, fatty acid amides, or swellable plastics such as PVC.

The total amount of fillers present in the compositions of the present invention will preferably be from 0 to 60 wt. %, and more preferably from 0 to 30 wt. %, based on the total weight of the composition. The desired viscosity of the curable composition will typically be determinative of the total amount of filler added and it is submitted that in order to be readily extrudable out of a suitable dispensing apparatus—such as a tube—the curable compositions should possess a viscosity of from 3000 to 150,000, preferably from 40,000 to 80,000 mPas, or even from 50,000 to 60,000 mPas.

Examples of suitable pigments are titanium dioxide, iron oxides, or carbon black.

In order to enhance shelf life even further, it is often advisable to further stabilize the compositions of the present invention with respect to moisture penetration through using drying agents. A need also occasionally exists to lower the viscosity of an adhesive or sealant composition according to the present invention for specific applications, by using reactive diluent(s). The total amount of reactive diluents present will typically be up to 15 wt. %, and preferably from 1 to 5 wt. %, based on the total weight of the composition.

The presence of non-reactive diluents in the compositions of the present invention is also not precluded where this can usefully moderate the viscosities thereof. For instance, but for illustration only, the compositions may contain one or more of: xylene; 2-methoxyethanol; dimethoxyethanol; 2-ethoxyethanol; 2-propoxyethanol; 2-isopropoxyethanol; 2-butoxyethanol; 2-phenoxyethanol; 2-benzyloxyethanol;

benzyl alcohol; ethylene glycol; ethylene glycol dimethyl ether; ethylene glycol diethyl ether; ethylene glycol dibutyl ether; ethylene glycol diphenyl ether; diethylene glycol; diethylene glycol-monomethyl ether; diethylene glycol-monoethyl ether; diethylene glycol-mono-n-butyl ether; diethylene glycol dimethyl ether; diethylene glycol diethyl ether; diethylene glycoldi-n-butylyl ether; propylene glycol butyl ether; propylene glycol phenyl ether; dipropylene glycol; dipropylene glycol monomethyl ether; dipropylene glycol dimethyl ether; dipropylene glycoldi-n-butyl ether; N-methylpyrrolidone; diphenylmethane; diisopropylnaphthalene; petroleum fractions such as Solvesso® products (available from Exxon); alkylphenols, such as tert-butylphenol, nonylphenol, dodecylphenol and 8,11,14-pentadecatrienylphenol; styrenated phenol; bisphenols; aromatic hydrocarbon resins especially those containing phenol groups, such as ethoxylated or propoxylated phenols; adipates; sebacates; phthalates; benzoates; organic phosphoric or sulfonic acid esters; and sulfonamides.

The above aside, it is preferred that said non-reactive diluents constitute less than 10 wt. %, in particular less than than 5 wt. % or less than 2 wt. %, based on the total weight of the composition.

Illustrative Embodiment of the One Component (1K) Composition

In an exemplary embodiment of the present invention, the one component (1K) composition comprises, based on the weight of the composition:

- from 60 to 90 wt. % of a) at least one epoxy resin;
- from 5 to 25 wt. % of b) at least one organoboron compound selected from cycloamidinium tetrasubstituted borate salts and imidazolium tetrasubstituted borate salts;
- from 5 to 20 wt. % of c) at least one (meth)acrylamide monomer of Formula (VII):

(VII)

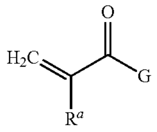

wherein: $R^e$ is H or Me;

G is selected from $—NH_2$, $—NHR^b$ and $—N(R^b)(R^c)$;

$R^b$ and $R^e$ are independently selected from $C_1$-$C_{12}$alkyl, $C_1$-$C_{12}$ hydroxyalkyl, $C_1$-$C_{12}$ alkalkoxy and $—(CH_2)_n—NR^d R^e$;

n is an integer of from 2 to 4; and, $R^d$ and $R^e$ are independently selected from $C_1$-$C_4$ alkyl.

Methods and Applications

To form a composition, the above described parts are brought together and mixed. As is known in the art, to form one component (1K) curable compositions, the elements of the composition are brought together and homogeneously mixed under conditions which inhibit or prevent the reactive components from reacting: as would be readily comprehended by the skilled artisan, this might include mixing conditions which limit or prevent exposure to moisture, heat or irradiation or which limit or prevent the activation of a constituent latent catalyst. As such, it will often be preferred that the curative elements are not mixed by hand but are instead mixed by machine—a static or dynamic mixer, for example—in pre-determined amounts under anhydrous conditions without intentional heating or photo-irradiation.

In accordance with the broadest process aspects of the present invention, the above described compositions are applied to a substrate and then cured in situ. Prior to applying the compositions, it is often advisable to pre-treat the relevant surfaces to remove foreign matter there from: this step can, if applicable, facilitate the subsequent adhesion of the compositions thereto. Such treatments are known in the art and can be performed in a single or multi-stage manner constituted by, for instance, the use of one or more of: an etching treatment with an acid suitable for the substrate and optionally an oxidizing agent; sonication; plasma treatment, including chemical plasma treatment, corona treatment, atmospheric plasma treatment and flame plasma treatment; immersion in a waterborne alkaline degreasing bath; treatment with a waterborne cleaning emulsion; treatment with a cleaning solvent, such as carbon tetrachloride or trichloroethylene; and, water rinsing, preferably with deionized or demineralized water. In those instances where a waterborne alkaline degreasing bath is used, any of the degreasing agent remaining on the surface should desirably be removed by rinsing the substrate surface with deionized or demineralized water.

In some embodiments, the adhesion of the coating compositions of the present invention to the preferably pre-treated substrate may be facilitated by the application of a primer thereto. Whilst the skilled artisan will be able to select an appropriate primer, instructive references for the choice of primer include but are not limited to: U.S. Pat. Nos. 3,671,483; 4,681,636; 4,749,741; 4,147,685; and, 6,231,990.

The compositions are then applied to the preferably pre-treated, optionally primed surfaces of the substrate by conventional application methods such as: brushing; roll coating using, for example, a 4-application roll equipment where the composition is solvent-free or a 2-application roll equipment for solvent-containing compositions; doctor-blade application; printing methods; and, spraying methods, including but not limited to air-atomized spray, air-assisted spray, airless spray and high-volume low-pressure spray. For coating and adhesive applications, it is recommended that the compositions be applied to a wet film thickness of from 10 to 500 μm. The application of thinner layers within this range is more economical and provides for a reduced likelihood of thick cured regions that may—for coating applications—require sanding. However, great control must be exercised in applying thinner coatings or layers so as to avoid the formation of discontinuous cured films.

The curing of the compositions of the invention can occur at temperatures in the range of from 100° C. to 200° C., preferably from 100° C. to 170° C., and in particular from 120° C. to 160° C. The temperature that is suitable depends on the specific compounds present and the desired curing rate and can be determined in the individual case by the skilled artisan, using simple preliminary tests if necessary. Where applicable, however, the temperature of the mixture formed from the respective components of the composition may be raised above the mixing temperature and/or the application temperature using conventional means including microwave induction.

For completeness, it is noted that the present invention does not preclude the preparation of epoxy adhesives in the form of "film adhesive". A pre-polymer mixture of epoxy resins, hardener, and other desired components is applied as a coating onto a polymer film substrate, rolled up and stored at a sufficiently low temperature to inhibit the chemical reactions between the components. When needed, the film adhesive is removed from the low temperature environment and applied to a metal or composite part, the backing is stripped off and the assembly completed and cured in an oven or autoclave.

The curable compositions according to the invention may find utility inter alia in: varnishes; inks; binding agents for fibers and/or particles; the coating of glass; the coating and bonding of mineral building materials, such as lime- and/or cement-bonded plasters, gypsum-containing surfaces, fiber cement building materials and concrete; the coating, sealing or bonding of wood and wooden materials, such as chipboard, fiber board and paper; the coating or bonding of metallic surfaces; the coating of asphalt- and bitumen-containing pavements; the coating, sealing or bonding of various plastic surfaces; and, the coating of leather and textiles.

In a particularly preferred embodiment, the composition of the present invention is applied to structural substrates to produce an adherent, highly abrasion resistant coating or bond. The bonding operation can often be effected at less than 200° C. and effective abrasion resistance can be attained after curing. Moreover, when bonding to the surface of mechanical structures or to a floor or pavement, the coating compositions can provide a strong, reliable bond, provide thermal stability and corrosion protection for the surface and can prevent the surface from being contacted with compounds which would deleterious to the operation or efficiency of the specific structure.

The following example is illustrative of the present invention and is not intended to limit the scope of the invention in any way.

EXAMPLE

The following compounds and materials are employed in the Example:

JER™ 828: Bisphenol A, liquid epoxy resin formed by the condensation polymerization of bisphenol A and epichlorohydrin, available from Mitsubishi Chemical.

2-ethyl-4-methylimidazolium tetraphenyl borate: Available from Fuji Film Wako Chemical (CAS No. 53831-70-2)

N,N-dimethyl acrylamide: Available from Sigma Aldrich (CAS No. 2680-03-7)

The formulation described in Table 1 herein below was formed under mixing. The formulation was a clear, colorless liquid which showed no marked increase in viscosity when stored at room temperature for 7 days.

TABLE 1

| Ingredient | Weight Percentage of Composition (wt. %) |
|---|---|
| JER ™ 828 | 75 |
| 2-ethyl-4-methylimidazolium tetraphenyl borate | 15 |
| N,N-dimethyl acrylamide | 10 |

The composition was cured by heating to a temperature of 150° C. for 15 minutes. The obtained cured product was a clear, amber solid.

In view of the foregoing description and example, it will be apparent to those skilled in the art that equivalent modifications thereof can be made without departing from the scope of the claims.

What is claimed is:

1. A one-component (1K) composition comprising, based on the weight of the composition:

from 40 to 98 wt. % of a) at least one epoxy resin;

from 0.5 to 30 wt. % of b) at least one organoboron compound selected from tetrasubstituted borate salts of monovalent cations of tertiary amines;

wherein the at least one organoboron compound is represented by general Formula (VI) below:

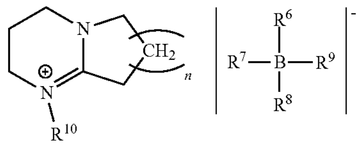

(VI)

wherein: $R^{10}$ is selected from the group consisting of H, $C_1$-$C_6$ alkyl, $C_6$-$C_{18}$ aryl, $C_7$-$C_{24}$ aralkyl, $C_3$-$C_{18}$ cycloalkyl and $C_2$-$C_{20}$ alkenyl;

$R^6$, $R^7$, $R^8$ and $R^9$ are independently selected from the group consisting of $C_1$-$C_6$ alkyl, $C_6$-$C_{18}$ aryl and $C_7$-$C_{24}$ alkylaryl; and, n is an integer of from 1 to 3;

and, from 5 to 15 wt. % of c) at least one (meth)acrylamide monomer of Formula (VII):

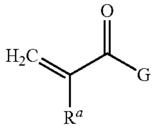

(VII)

wherein: $R^a$ is H or Me;

G is selected from the group consisting of —$NH_2$, —$NHR^b$ and —$N(R^b)(R^c)$;

$R^b$ and $R^c$ are independently selected from the group consisting of $C_1$-$C_{18}$ alkyl, $C_1$-$C_{18}$ hydroxyalkyl, $C_1$-$C_{18}$ alkalkoxy, $C_6$-$C_{18}$ aryl and —$(CH_2)_n$ —$N(R^d)(R^e)$;

n is an integer of from 1 to 4; and, $R^d$ and $R^e$ are independently selected from the group consisting of H and $C_1$-$C_6$ alkyl, wherein the composition is capable of cure within 15 min at 150° C. while showing no marked increase in viscosity when stored at room temperature for 7 days.

2. The composition according to claim 1 comprising, based on the weight of the composition:

from 50 to 98 wt. % of a) at least one epoxy resin;

from 1 to 25 wt. % of b) at least one organoboron compound selected from tetrasubstituted borate salts of monovalent cations of tertiary amines; and, from 5 to 15 wt. % of c) at least one (meth)acrylamide monomer.

3. The composition according to claim 1 comprising a) at least one epoxy resin selected from the group consisting of: glycidyl ethers of polyhydric alcohols and polyhydric phenols; glycidyl esters of polycarboxylic acids; and, epoxidized polyethylenically unsaturated hydrocarbons, esters, ethers and amides.

4. The composition according to claim 1, wherein $R^{10}$ is selected from the group consisting of H, $C_1$-$C_6$ alkyl, $C_3$-$C_{12}$ cycloalkyl, phenyl, naphthyl, benzyl and tolyl.

5. The composition according to claim 1, wherein part c) comprises at least one (meth)acrylamide monomer selected from the group consisting of: (meth)acrylamide; N-methyl (meth)acrylamide; N, N-dimethyl (meth)acrylamide; N-ethyl (meth)acrylamide; N, N-diethyl (meth)acrylamide; N-isopropyl (meth)acrylamide; N-n-butyl (meth)acrylamide; N-t-butyl (meth)acrylamide; N, N-di-n-butyl (meth) acrylamide; N-octyl (meth)acrylamide; N-dodecyl (meth) acrylamide; N-octadecyl (meth)acrylamide; N-phenyl (meth)acrylamide; N, N-dimethylaminoethyl (meth)acrylamide; N-(2-methoxyethyl) (meth)acrylamide; N-(2-ethoxyethyl) (meth)acrylamide N-(2-hydroxyethyl) (meth) acrylamide; and, N-(2-hydroxylpropyl) (meth)acrylamide.

6. A cured product obtained from the one component (1K) composition as defined in claim 1.

7. A cured reaction product as defined in claim 6 used as a coating, sealant or adhesive.

* * * * *